United States Patent
Buttle et al.

[11] Patent Number: 5,285,705
[45] Date of Patent: Feb. 15, 1994

[54] CONTINUOUS ACTING MOISTURE PREVENTION AND CLEANING VALVE

[75] Inventors: Donald R. Buttle, Geneva; Christopher J. Kenny, West Chicago, both of Ill.; Brian D. Newnan, Louisville, Ky.

[73] Assignee: Grindmaster Corporation, Louisville, Ky.

[21] Appl. No.: 42,861

[22] Filed: Apr. 6, 1993

[51] Int. Cl.⁵ .............................................. A47J 31/42
[52] U.S. Cl. .................................. 99/280; 99/286; 99/289 R; 137/624.13; 222/641; 241/100
[58] Field of Search .............. 99/280, 283, 286, 289 R; 241/100; 137/624.13, 624.15; 222/148, 504, 561, 640, 641

[56] References Cited

U.S. PATENT DOCUMENTS

| | | | |
|---|---|---|---|
| 3,444,892 | 5/1969 | Doyle et al. | 137/624.15 |
| 3,739,709 | 6/1973 | Herbsthofer et al. | 99/289 R |
| 4,572,060 | 2/1986 | Yung-Kuan | 99/280 |
| 4,659,023 | 4/1987 | Frei et al. | 241/100 |
| 4,789,106 | 12/1988 | Weber | 241/100 |
| 4,913,037 | 4/1990 | Newnan | 99/289 R |
| 4,971,259 | 11/1990 | Nidiffer | 241/100 |
| 5,224,414 | 7/1993 | Hunt | 99/286 |

FOREIGN PATENT DOCUMENTS 1185470   3/1970   United Kingdom ................. 99/288

*Primary Examiner*—Harvey C. Hornsby
*Assistant Examiner*—Mark Spisich
*Attorney, Agent, or Firm*—Camoriano & Smith

[57] ABSTRACT

A beverage mixing apparatus such as a coffee grinding and brewing apparatus is provided with an operative cycle which includes the transportation of a predetermined amount of a solid component of a beverage mixture from a storage compartment to and through a passageway into a mixing chamber wherein the liquid component of the beverage is mixed with the solid component. The apparatus further comprises a valve assembly associated with the passageway and having a plate movable between a closed position and an open position. The plate defines an opening which registers with the passageway when the plate is in the open position. A solenoid is connected to the plate for moving the plate between its open and closed positions. When the plate is in its open position the solid component can be moved from the storage chamber to the mixing chamber. In the closed position, the plate prevents moisture from the mixture from moving to the storage chamber through the passageway. A microprocessor control device in communication with the solenoid measures the time elapsed from a zero based time point, e.g., from the beginning of the last cycle, and causes the solenoid to open and shut when the elapsed time equals a predetermined value. The opening and shutting of the valve during the time period when the beverage apparatus is not being cycled breaks the fusion of the plate to other surfaces exposed to moisture emanating from the mixing of the solid component with said liquid component.

9 Claims, 3 Drawing Sheets

CONTINUOUS ACTING MOISTURE PREVENTION AND CLEANING VALVE

FIELD OF THE INVENTION

This invention relates to a beverage preparation apparatus in which a liquid component and a solid component such as a powder or coffee grounds are mixed to form a beverage and, more particularly, an apparatus in which a slide valve is used not only to protect the solid component from moisture emanating from the mixture of liquid and solid in a combination coffee bean grinder and brewing apparatus but continuously operates to remove particles resulting from evaporation of moisture from the exposed surfaces of the apparatus. This application is related to U.S. application Ser. No. 07/951,449 filed Sep. 9, 1992 and commonly assigned to the same assignee as the present invention, U.S. Pat. No. 5,224,414.

BACKGROUND OF THE INVENTION

Apparatus used to make beverages from a solid component and a liquid component for distributing directly to the consumer are legion in number. One example is a machine which meters a predetermined amount of powder and water to a mixing area. Another example is combination coffee grinders and brewers that are finding great acceptance from restaurants and the like. Brewing coffee directly from freshly ground beans in the same apparatus has considerable appeal. A typical combination grinding and brewing apparatus employs a hopper which upon a signal discharges beans into a proportioning device which measures the desired quantity of beans. The beans are then transferred to a grinder that grinds the beans to a desired consistency after which the ground coffee is delivered to a filter within the brewing basked immediately before hot water is sprayed over the grounds. A common feature in most apparatus of this type is the use of a sealing structure which prevents moisture emanating from the hot water tank and brewing basket from reaching the interior of the grinder assembly. Wetting of the grounds prior to reaching the brewing basket is undesirable, particularly when the grounds are still in the grinder itself. It causes problems with the proper distribution of the ground coffee to the brew basket and is difficult to clean.

A number of structures have been devised to prevent the egress of unwanted moisture into the grinder. An example may be found in U.S. Pat. No. 4,913,037 issued to Brian D. Newnan and assigned to the same assignee as the present invention. In the patent, the passage between the grinder and the brew basket is conveniently sealed by a solenoid operated valve which is open during the grinding operation but closes when the grinder motor shuts down. The valve is a flap of material which is pivotally mounted, biased into a closed position and responsive to the movement of a solenoid plunger for opening the passageway. The valve can also be manually opened by use of a finger tab thus allowing access into the passageway for cleaning when required. The passageway itself is defined by an elbow shaped hood which serves to guide the coffee grounds when ejected from the grinder through the valve opening into the brew basket.

The prior art device mentioned above does not meet the basic requirements of combination grinder brewers in which space is severely restricted. For example, the pivoting action of the prior art valve and the linkage to the solenoid plunger require valuable space as does the passageway defined by the elbow shaped hood. Additionally, it is desirable to have an apparatus having a valve assembly in which the moisture of the brewing operation could be sealed off during the brewing cycle without the sacrifice of valuable space while simultaneously maintaining good coffee ground dispersal across the filter paper within the brew basket. Additionally, the valve assembly should allow for easy manual access into the valve interior for cleaning and maintenance. Such an apparatus is described in the aforementioned U.S. application Ser. No. 07/951,449 which provides for a coffee grinding and brewing apparatus in which the passageway communicating with the grinder and brewing area is selectively opened when the grinder motor is activated and closed when not. Thus, moisture emanating from the brewing cycle cannot reach the grinder as the passageway therebetween is sealed shut. A slide plate or shutter having an opening is directly connected to a solenoid by a solenoid plunger. When the grinder is activated, the solenoid is activated and moves the shutter into an open position in which the opening of the shutter is in registry with the opening of the grinder head. The movement of the solenoid plunger and plate are essentially coplanar which reduces the number of working and moving parts. Moreover, the shutter is provided with a tab finger which extends into the brewing area a sufficient distance to deflect at least a portion of the stream of coffee grounds ejected from the grinder thereby ensuring the coffee grounds are properly distributed prior to brewing. The timing of operation sequence is such that the solenoid valve remains operational for a predetermined time period after the grinder cease operation. Once the predetermined time period has elapsed, the solenoid shuts off and a biasing element closes the shutter just prior to the brewing cycle so that moisture therefrom does not proceed into the grinding head.

While the above valve operates as intended, it has been noted, that after operation of the apparatus over an extended period of time, a residue builds up on the surfaces exposed to the moisture emanating from the solid and liquid mixing side, e.g., the brewer. The residue comes from certain soluble compounds that are carried by the moisture and are left on the exposed surfaces due to evaporation. The film contaminant is often sticky causing the moving surfaces to fuse together, making it nearly impossible to operate the device. One solution is to provide a larger solenoid to move the slide valve. While the finger tab does provide one way to move apart the fused surfaces, it does require frequent attention which may not be practical in most operating environments.

SUMMARY OF THE INVENTION

The present invention provides for a coffee grinding and brewing apparatus having a cycle which includes the transportation of a predetermined amount of a solid component of a beverage mixture to and through a passageway into a region in which the liquid component of the beverage is mixed with the solid component. The apparatus comprises a valve assembly having a plurality of elements defining the passageway, the valve assembly including a plate movable between a closed position and an open position. The plate defines an opening which registers with the passageway when the plate is in the open position. A solenoid is connected to the plate for moving the plate and opening into and out of registry with the passageway thereby preventing moisture from the mixture from moving from the region through the passageway. A microprocessor control device in communication with the solenoid measures the time elapsed from a zero based time point, e.g., from the beginning of the last cycle, and causes the solenoid to open and shut when the elapsed time equals a predetermined value. The opening and shutting of the valve during the time period when the beverage apparatus is not being cycled breaks the fusion of the plate to other surfaces exposed to moisture emanating from the mixing of the solid component with said liquid component.

The above and other features and advantages of this invention and the manner of realizing them will become more apparent, and the invention itself will best be understood, from a study of the following and appended claims, with reference being made to the attached drawings showing some preferred embodiments of the invention.

DETAILED DESCRIPTION OF THE PREFERRED EMBODIMENT

Figure 1:
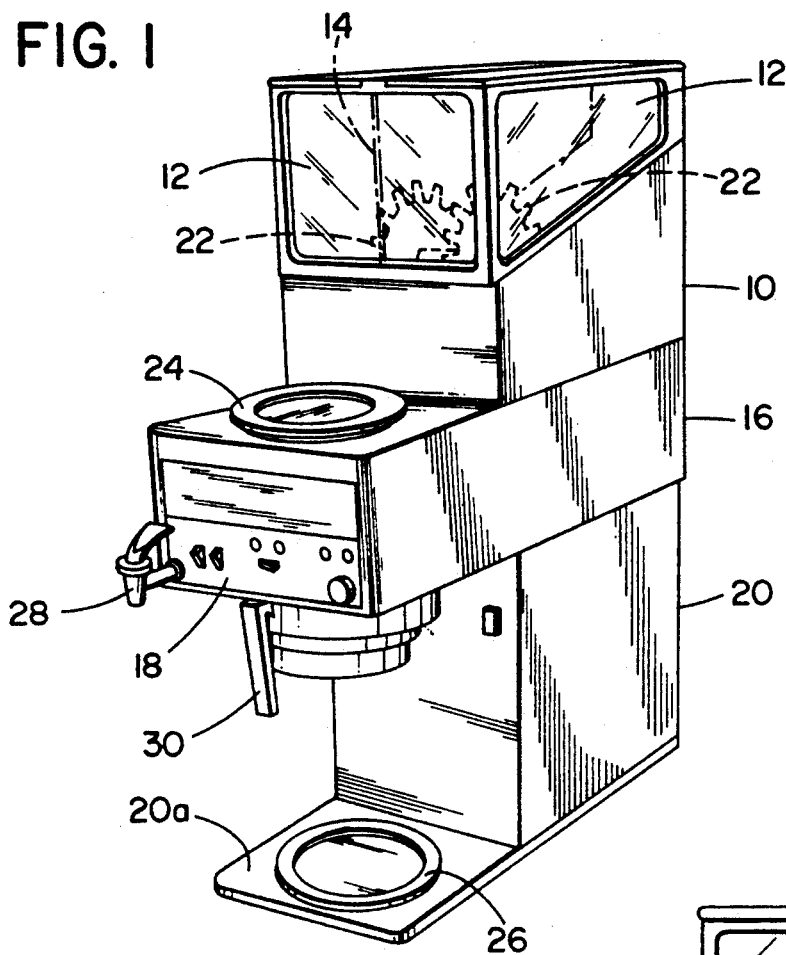
FIG. 1 shows a perspective view of a grinder brewer assembly in which the preferred embodiment of the invention forms a component.
Figure 2:
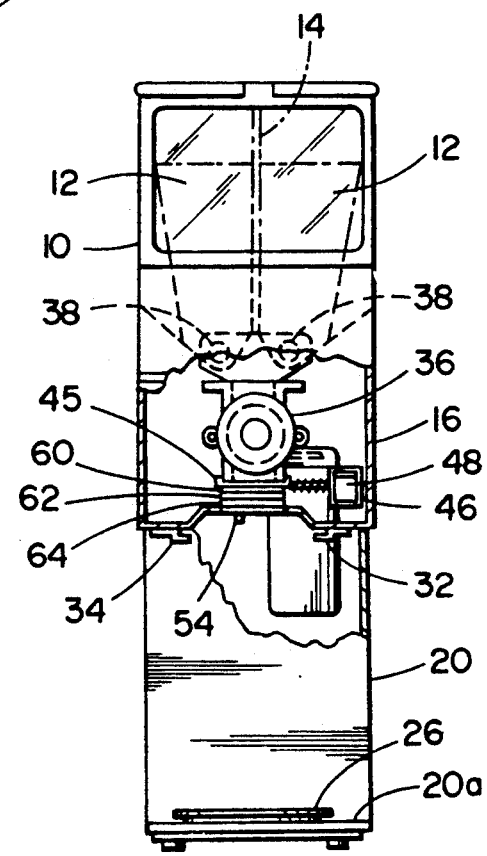
FIG. 2 is a front view of FIG. 1, partially broken away, to illustrate the front side of the grinder and its spacial relationship with the grinder motor and the solenoid operated valve assembly.
Figure 3:
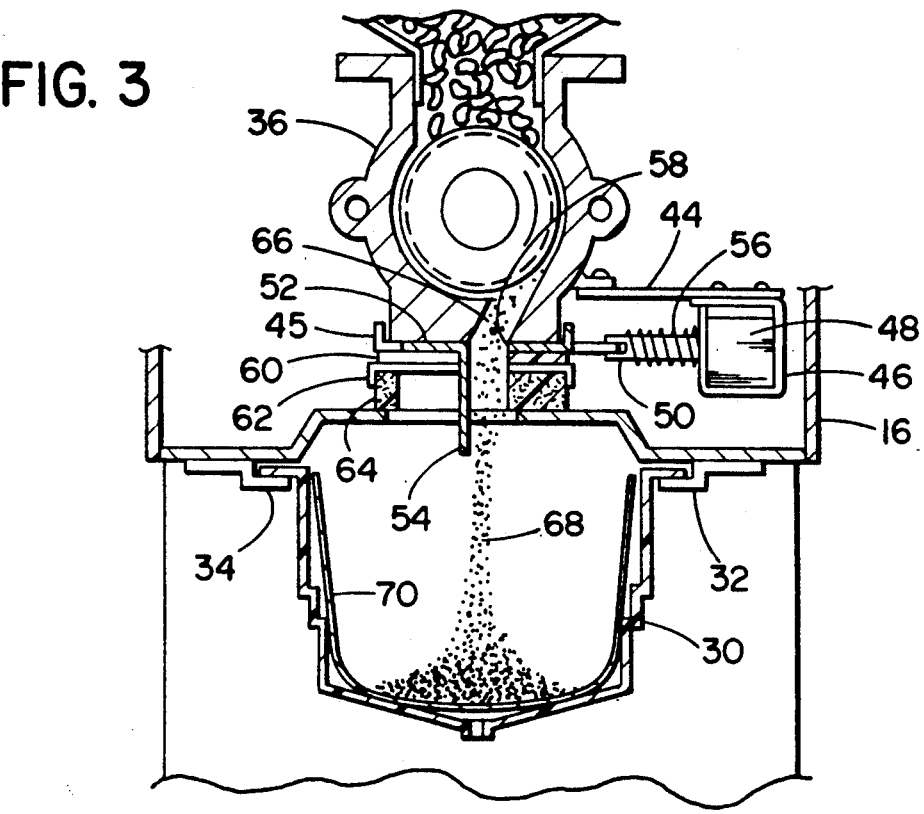
FIG. 3 is a front sectional view of the grinder head and solenoid slide assembly when the slide is in the open position demonstrating the deflection of a coffee ground stream by the downwardly extending finger tab.

The perspective of FIG. 1 illustrates the front and side exterior of a dual hopper grinder brewer apparatus described in greater detail in commonly assigned and copending U.S. application Ser. No. 07/816,749 filed Jan. 27, 1992, U.S. Pat. No. 5,217,108. The details of the auger-grinder-brewer assembly of application are not essential for the understanding of the present invention. Generally, as depicted the dual hopper, grinding and brewing apparatus can be visualized best by being comprised in three sections: a hopper section 10 comprising a pair of hoppers 12 separated by an interior wall 14; a panel section 16 containing the front control panel 18; and a lower section 20. Positioned in each hopper 12 is an agitator wheel 22 serving to break up clumps of coffee beans and move the coffee beans within each hopper. A pair of electrically heated plates 24 and 26 are respectively mounted on the top surface of panel section 16 and extension 20a of the lower section 20 function to maintain coffee in coffee decanters warm. The control panel 18 is provided with the various manual controls needed to operate the apparatus including a hot water spigot 28 for obtaining hot water for other beverage needs. A brew basket 30 for holding the filter paper and coffee grounds is mounted beneath the underside of the panel section 16 between a pair of brew basket arms 32 and 34 as seen in FIGS. 2 and 3. As seen in the front view of FIG. 2, grinder 36 is mounted in the panel section 16 beneath the hoppers 12 to receive the coffee beans that are transferred from a selected hopper by an auger mechanism 38 shown in dashed lines.

FIG. 3 illustrates one of the functions of finger tab 54 which takes place during grinder operation. The specific details of the solenoid assembly are described in detail in referenced copending and commonly assigned U.S. application Ser. No. 07/951,449 incorporated by way of reference herein. During the grinder cycle the shutter plate 52 is moved against the biasing force of spring 56 by action of solenoid plunger 50 so that opening 58 registers with opening 66 in grinder head 36. In the plane of FIG. 3, the grinding burrs of grinder head 36 spin in a clock-wise motion causing the coffee grounds 68 to be thrown toward the left side of the brew basket 30 lined with a filter 70. Ordinarily, the distribution of the coffee grounds within filter 70 would be skewed to one side which could deleteriously effect the quality of the brewed coffee. However, finger tab 54, which extends down through the opening defined by keeper 62 and seal 64, deflects grounds 68 to provide a more even distribution of the coffee grounds over filter 70. It should be noted, however, that the opening 66 is not centered in relationship to the passageway defined by the various valve components in order to ensure that the coffee stream impacts further down the passageway and against tab 54.

Additionally, finger tab 54 also permits shutter 52 to be manually opened against the bias of shutter spring 56. Manual opening of the shutter plate greatly assists the cleaning and maintenance of the shutter mechanism.

Figure 4:
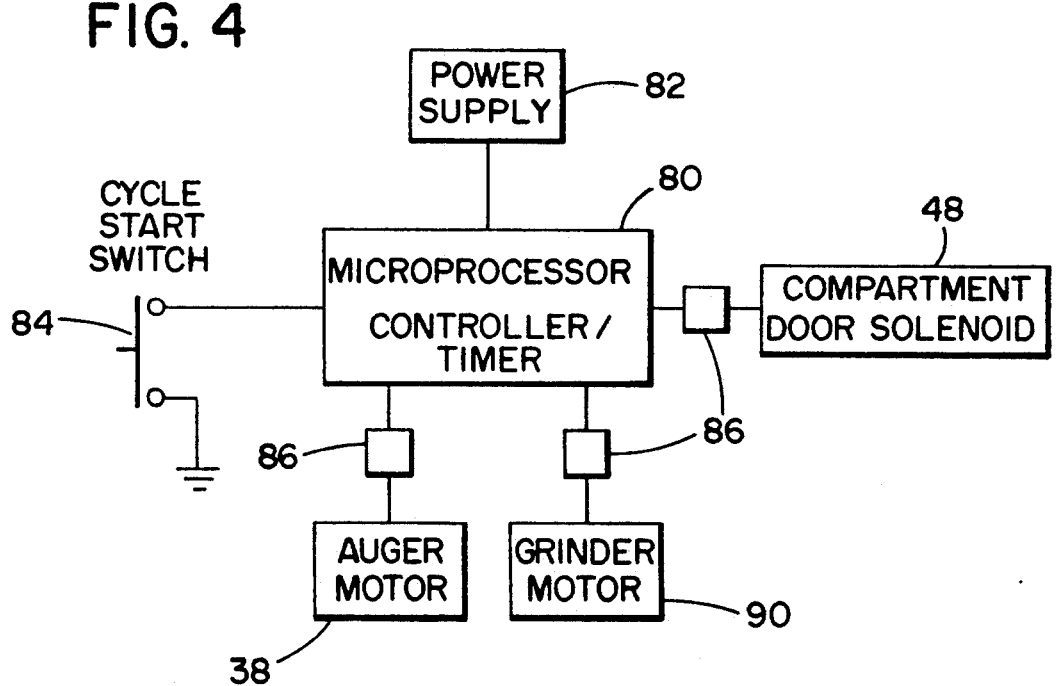
FIG. 4 is a schematic of the system operating the solenoid valve assembly and grinder of the present invention.

Reference is now made to FIG. 4, a programmable microprocessor 80 is connected to a 120 volt AC electrical source 82, cycle start button 84, and by appropriate electrical relays 86 to solenoid 48, motor 88 for auger mechanism 38, and motor 90 of grinder 36. The purpose of relays 86 is to provide sufficient driving force to the components controlled by microprocessor 80. A programmable microprocessor suitable for such purposes may be obtainable from Motorola as Model Number 68HCO5P9. Suitable relays may be purchased from the Omron Company as Model Number G2R114P.

Figure 5:
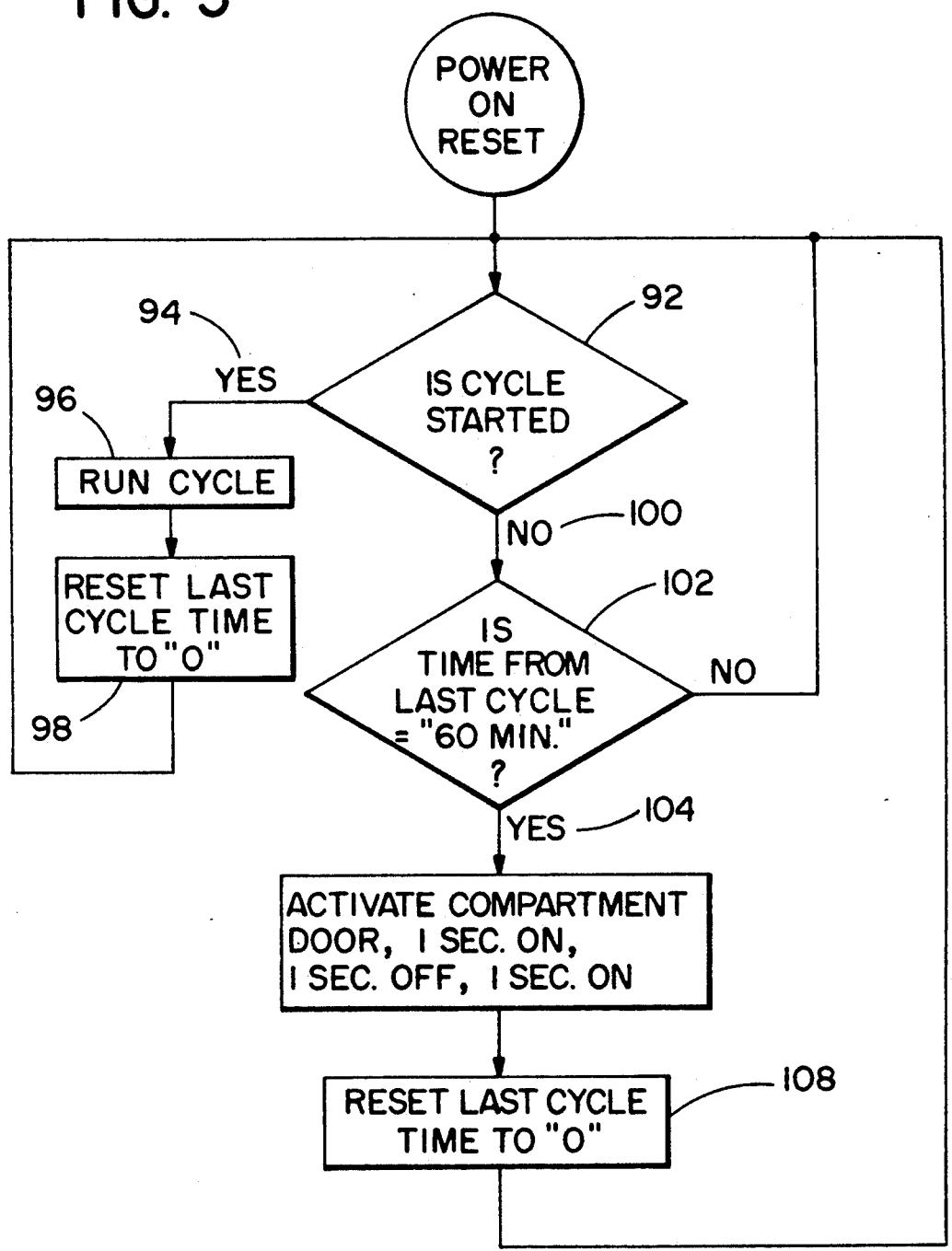
FIG. 5 is a flow diagram of the circuit of FIG. 4.

It is a purpose of the present invention that solenoid 48 be activated automatically at predetermined intervals when the grinder-brewer apparatus is not cycling, i.e., not grinding and brewing. The predetermined intervals should be frequent enough to prevent any significant build up of residue left by evaporation on the exposed surfaces of the apparatus. The predetermined time intervals are preferably measured from the last cycle of the solenoid. The flow diagram of FIG. 5 illustrates this set of sequences. Upon the initiating of a cycle by an operator, i.e., closing of start button 84, microprocessor 80 determines if a cycle has been started in sequence 92. If YES is true indicated by sequence 94, then microprocessor 80 signals auger motor 88 and grinder 90 to start their individual RUN CYCLE OPERATIONS in sequence 96. Simultaneously, solenoid 48 is signaled to open slide 52, permitting the ground coffee proceeding from the grinder to impact against tab finger 54 and be properly distributed over the brewer basket 30 against tab finger 54. After a predetermined time interval auger motor 88 times out followed shortly by grinder motor 90 to ensure that all beans received by the grinder are ground. Similarly, a short predetermined time interval after grinder motor 90 ceases operation, slide valve 52 is allowed to retract to its closed position. Closing of the slide valve before brewing operation commences prevents moisture from seeping into the grinder and other dry operating components. All of this activity is controlled by microprocessor 80. As a final sequencing step, microprocessor commences a RESET CYCLE TIME sequence 98 in which microprocessor 80 starts an internal clock measured from the beginning of the cycle. Microprocessor 80 then reverts to sequence 92 in which it continuously monitors the time from the last cycle or reset time.

When microprocessor 80 determines in sequence 92 that no cycle has been commenced, i.e., NO CYCLE sequence 100 ( a not true situation), and that TIME FROM LAST CYCLE (sequence 102) equals a predetermined value as denoted by YES (or true) sequence 104, then solenoid valve 80 is again signaled and the slide valve 52 is preferably rapidly opened and shut, e.g., open for one second, closed for one second, and open for still another second before returning to the closed state as shown in ACTIVATE COMPARTMENT DOOR sequence 106. The successive opening and closing of slide valve 52 at the predetermined time intervals prevents unwanted sticking of the moving parts and removes substantially all of the residue film that has built upon valve 52 and adjacent surface parts. Following sequence 106, microprocessor then in sequence 108 resets the LAST CYCLE TIME to again equal zero and reverts again to sequence 92 whereupon the internal clock starts anew from a base zero.

Although in the preferred embodiment, microprocessor 80 uses the beginning of the last cycle as the zero base time point, a viable alternative would have the zero time point independent of the last cycle. Thus, the opening and shutting would occur at regular intervals around the clock as long as a cycle was not in progress and the apparatus was receiving electrical power.

As is readily inferred from a reading of the detailed description and the appended drawing, the present invention is not only suitable for use with combination coffee grinders and brewers, but with any beverage making apparatus where it is desirable that the solid component be distributed evenly in the region of mixture and that excess moisture be prevented from moving into the solid component holding area. Additionally it may be used with coffee brewers in which preground coffee is housed in the hoppers and moved directly to the brewer therefrom. Thus, while the invention has been described in detail with respect to the preferred embodiment, it is not intended that the scope of the invention be limited other than set forth in the following claims.

We claim:

1. In a beverage making apparatus having a storage chamber for storing a solid component of a beverage mixture, a mixing chamber for mixing said solid component with a liquid component of the mixture, and a control device to initiate and end cycles of operation of the apparatus, each cycle starting with a transportation of a predetermined amount of said solid component of said beverage mixture to and through a passageway connecting said storage chamber with said mixing chamber and ending with a mixing of said solid component and said liquid component, said apparatus further comprising:

(a) a valve assembly operatively associated with said passageway and including a plate movable between a closed position and an open position, said plate defining an opening therethrough which registers with said passageway when said plate is in said open position thereby permitting transportation of said predetermined amount of said solid component during a cycle from said storage chamber through said passageway to said mixing chamber, said opening not in registry with said passageway when said plate is in said closed position wherein said plate prevents moisture from said mixing chamber from moving through said passageway into said storage chamber;

(b) an operative element connected to said plate for moving said plate between said open and closed positions; and (c) said control device including a time measuring component in communication with said operative element for causing said operative element to open and close said plate between successive cycles of said apparatus when said component determines that a predetermined time interval has been reached, said component initiating the measure of said time interval from a time point within a cycle and being reset to a zero time point each time a new cycle is initiated wherein said plate in moving between open and closed positions between cycles breaks the build up of residue that fuses said plate to adjacent surfaces of said passageway due to exposure to moisture emanating from the mixing of the solid component with said liquid component.

2. The apparatus of claim 1 in which said control device begins measuring said predetermined time interval at the start of each new cycle.

3. The apparatus of claim 1 in which said control device causes said operative element to move said plate between said open and closed positions a plurality of times when said time measuring component determines that a predetermined time interval has occurred.

4. The apparatus of claim 3 in which said control device resets said time measuring component to a zero time point when said time measuring component determines that a predetermined time interval has occurred.

5. The apparatus of claim 1 including a finger tab connected to said plate and extending through said passageway a distance sufficient for manual manipulation of said plate between said open and closed positions.

6. A coffee bean grinding and brewing apparatus having a transporting device for transporting a predetermined amount of coffee beans to a grinder, said grinder grinding the coffee beans to ground coffee and moving said ground coffee through a passageway to a brewing basket wherein hot water is distributed over said ground coffee, said apparatus further comprising (a) a valve assembly operatively associated with said passageway and including a plate movable between a closed position and an open position, said plate defining an opening therethrough which registers with said passageway when said plate is in said open position thereby permitting movement of ground coffee from said grinder through said passageway to said brewing basket, said opening not in registry with said passageway when said plate is in said closed position wherein said plate prevents moisture from said brewing basket from moving through said passageway into said grinder;

(b) an operative element connected to said plate for moving said plate between said open and closed positions;

(c) coffee grinding and brewing cycle initiating switch for initiating grinding of the coffee beans, opening and closing said plate, and brewing coffee from the ground coffee; and (d) a control device connected to said switch and being responsive to the closing of said switch for initiating a cycle of operation of said apparatus, said cycle starting with the initiation of operation of said transporting device and being completed upon the completion of brewing of said coffee grounds, said control device operating said transporting device for a first predetermined time period, operating said grinder for a second predetermined time period ending after said first predetermined time period, and causing said operative element to open said plate for a third predetermined time period ending after said second predetermined time period, said control device means including a time measuring component in communication with said operative element for causing said element to move said plate between said open and closed positions between successive cycles when a predetermined time interval has occurred before the start of a new cycle, said predetermined time interval being measured from a point of time during a cycle whereupon the movement of said plate following the occurrence of said predetermined time interval breaks the fusing of said plate to adjacent surfaces of said passageway due to residue build up from exposure to moisture emanating from the brewing basket.

7. The apparatus of claim 6 in which said control device measures the time interval from an initiation of a cycle by said switch and causes said operative element to move said plate between open and closed positions when said component determines that the time interval has been reached and no subsequent cycle has occurred.

8. The apparatus of claim 7 in which said control device causes said operative element to move said plate a plurality of times when said component determines that a time interval has been reached and no subsequent cycle has occurred.

9. The apparatus of claim 7 in which said control device resets said time measuring component to a zero time point when said component determines that a time interval has been reached and no subsequent cycle has occurred.

* * * * *